United States Patent
Kim et al.

(10) Patent No.: US 11,733,571 B2
(45) Date of Patent: Aug. 22, 2023

(54) FIELD OF VIEW AND COHERENCE ACTIVE CONTROL RANDOM REFRACTION DEVICE AND MANUFACTURING METHOD THEREFOR

(71) Applicant: Kyungpook National University Industry-Academic Cooperation Foundation, Daegu (KR)

(72) Inventors: Hak-Rin Kim, Daegu (KR); Kyung-Il Joo, Daegu (KR); Tae-Hyun Lee, Daegu (KR); Min-Kyu Park, Daegu (KR)

(73) Assignee: Kungpook National University Industry-Academic Cooperation Foundation, Daegu (KR)

( * ) Notice: Subject to any disclaimer, the term of this patent is extended or adjusted under 35 U.S.C. 154(b) by 0 days.

(21) Appl. No.: 17/692,441

(22) Filed: Mar. 11, 2022

(65) Prior Publication Data
US 2022/0197077 A1    Jun. 23, 2022

Related U.S. Application Data

(63) Continuation of application No. PCT/KR2020/011330, filed on Aug. 25, 2020.

(30) Foreign Application Priority Data

Sep. 11, 2019   (KR) .......................... 1020190113032

(51) Int. Cl.
  *G02F 1/1333*   (2006.01)
  *G02F 1/1334*   (2006.01)
  (Continued)

(52) U.S. Cl.
  CPC ........ *G02F 1/13476* (2013.01); *G02F 1/0136* (2013.01); *G02F 1/1396* (2013.01); *G02F 1/133362* (2013.01); *G02F 1/133365* (2013.01); *G02F 1/133504* (2013.01); *G02F 1/134309* (2013.01); *G02F 2203/07* (2013.01)

(58) Field of Classification Search
  CPC .... G02F 1/0136; G02F 1/1323; G02F 1/1333; G02F 1/133362; G02F 1/133365;
  (Continued)

(56) References Cited

U.S. PATENT DOCUMENTS

2007/0046897 A1   1/2007 Hwang et al.
2012/0169965 A1   5/2012 Tang et al.

FOREIGN PATENT DOCUMENTS

JP   S61289619 A   12/1986
JP   06082635 H    3/1993
(Continued)

OTHER PUBLICATIONS

International Search Report and Written Opinion for Application No. PCT/KR2020/011330 dated Dec. 3, 2020.
(Continued)

*Primary Examiner* — Thoi V Duong
(74) *Attorney, Agent, or Firm* — KDW Firm PLLC

(57) ABSTRACT

An active random refraction device includes a random structure having the same refractive index characteristics regardless of polarization direction of light, a liquid crystal polymer on the random structure with refractive index characteristics changing according to polarization direction of the light, a polarization switching device, and a refractive surface with an inclination angle randomly distributed along the horizontal direction perpendicular to the incident direction of the light. The active random refraction device can be switched between a transmission mode and a refractive mode according to the polarization of the light.

13 Claims, 17 Drawing Sheets

(51) Int. Cl.
*G02F 1/1335* (2006.01)
*G02F 1/1347* (2006.01)
*G02F 1/01* (2006.01)
*G02F 1/1343* (2006.01)
*G02F 1/139* (2006.01)

(58) Field of Classification Search
CPC .............. G02F 1/1334; G02F 1/1335; G02F 1/133504; G02F 1/1336; G02F 1/13363; G02F 1/133633; G02F 1/133634; G02F 1/134309; G02F 1/13476; G02F 1/1396; G02F 2203/07; G02B 3/00; G02B 3/0087; G02B 3/0037; G02B 5/30
See application file for complete search history.

(56) References Cited

FOREIGN PATENT DOCUMENTS

| | | |
|---|---|---|
| JP | H05204001 A | 8/1993 |
| JP | H09152579 A | 6/1997 |
| JP | 2005104149 A | 4/2005 |
| KR | 10-2005-0068175 A | 7/2005 |
| KR | 10-0634550 B1 | 10/2006 |
| KR | 10-0958254 B1 | 5/2010 |
| KR | 20100122315 A | 11/2010 |
| KR | 10-2017-0114068 A | 10/2017 |
| KR | 10-1876529 A | 7/2018 |
| KR | 10-1886793 B1 | 8/2018 |
| KR | 10-2018-0099138 A | 9/2018 |
| KR | 10-1950379 B1 | 2/2019 |

OTHER PUBLICATIONS

Park et al, "Continuous Viewing Angle Distribution Control of Liquid Crystal Displays Using Polarization-Dependent Prism Array Film Stacked on Directional Backlight Unit," Journal of the Optical Society of Korea, vol. 20, No. 6, Dec. 2016, pp. 799-806.

Hyeon et al., "2D/3D Convertible Digital Holographic Display Using Active Switching Random-Refraction Device as Back Light Unit," IMID, Aug. 30, 2019.

Japanese Office Action for Application No. 2022516294 dated May 2, 2023.

FIG. 9
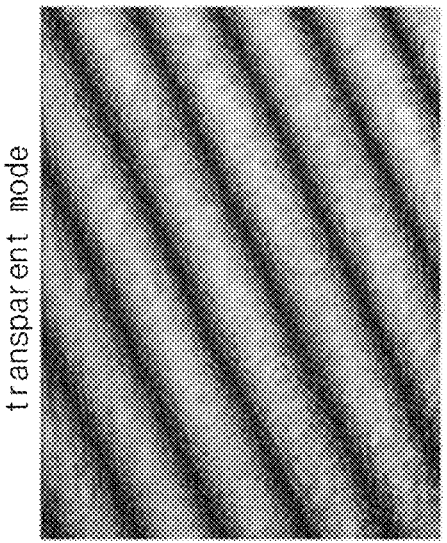
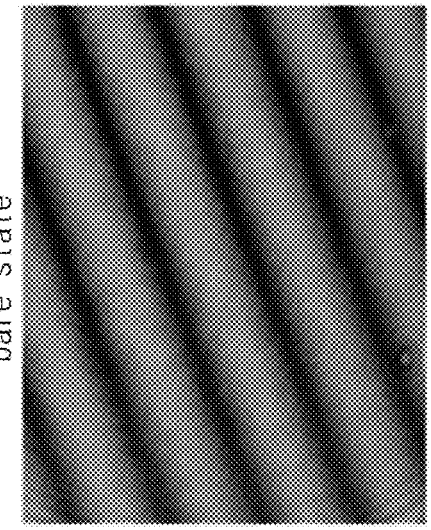
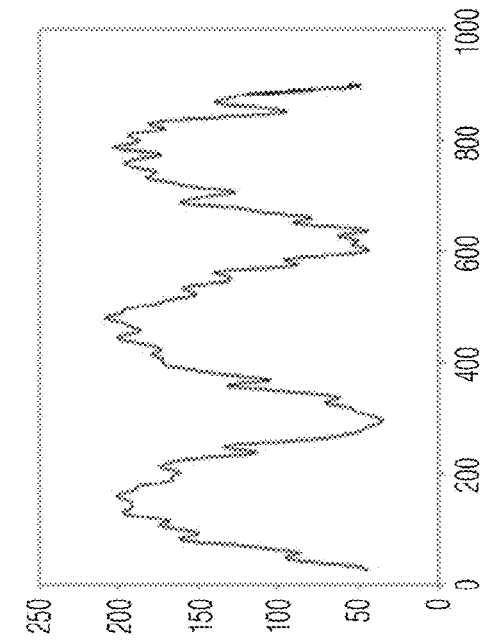
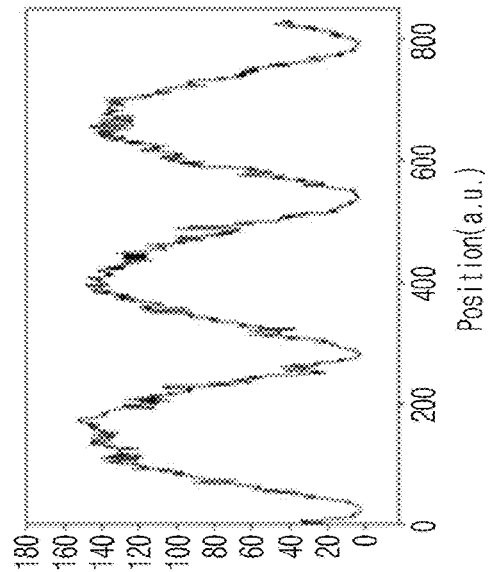

transparent mode  　　　　　random-refraction mode
(a)　　　　　　　　　　　　(b)

FIG. 15
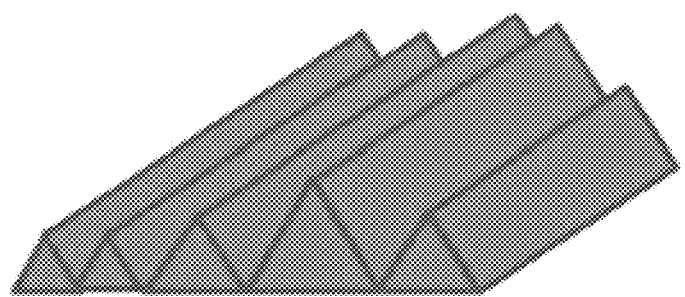
(a)
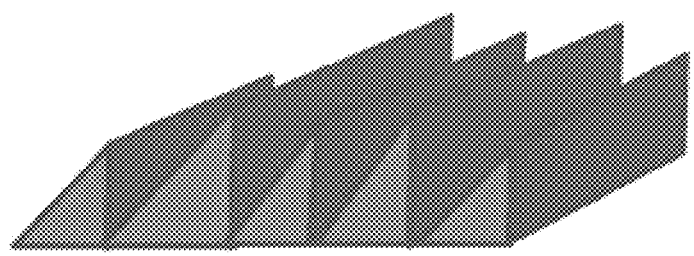
(b)

FIELD OF VIEW AND COHERENCE ACTIVE CONTROL RANDOM REFRACTION DEVICE AND MANUFACTURING METHOD THEREFOR

CROSS-REFERENCE TO RELATED APPLICATIONS

This application is a continuation application from and claims priority to International Patent Application No. PCT/KR2020/011330, filed on Aug. 25, 2020, which claims priority to Korean patent application No. 10-2019-0113032 filed on Sep. 11, 2019, the disclosures of both of which are incorporated by reference herein in their entireties.

TECHNICAL FIELD

The present invention relates to a field of view and coherence active control random refraction device and a manufacturing method, and more particularly, to an active random refraction device capable of solving problems of a high voltage driving and a low response speed while securing a high viewing angle due to use of an active polarization switching device capable of being electrically switched via a structure separated from a random structure.

BACKGROUND

FIG. 1 is a conceptual view of polymer stabilized cholesteric texture films (PSCT) using an electric field. The PSCT has a structure in which a polymer is mixed with a cholesteric liquid crystal. The PSCT switches between a scattering mode and a transparent mode according to the present of applied electric field. In off state where an electric field is not applied, the PSCT has a focal conic state in which the cholesteric liquid crystals are randomly distributed and thus scatters the incident light (scattering mode) as illustrated in (a) of FIG. 1. In an on state where an electric field is applied, all liquid crystals are aligned in a direction perpendicular to an electrode, and the incident light is transmitted (transparent mode) without being scattered as illustrated in (b) of FIG. 1. The PSCT has an advantage of having small haze characteristics with respect to an oblique ray because an amount of a polymer used for stabilizing the cholesteric liquid crystal is small. However, a cell gap of the liquid crystal is required to increase for securing a viewing angle (scattering degree), and thus a driving voltage for switching the on/off states increases. That is, the driving voltage and the viewing angle have a trade off relationship, and it is impossible to simultaneously securing a low driving voltage and a high viewing angle.

FIG. 2 is a conceptual view of a polymer dispersed liquid crystal (PDLC) using an electric field. The PDLC is a sphere in which fine liquid crystal droplets are disposed in a polymer material. The photocurable polymer material is mixed with the liquid crystal, and then raw materials of the polymer material are polymerized by ultraviolet light. The polymer and liquid crystal molecules cause phase separation before being polymerized and thereby providing small liquid crystal droplets between polymer networks. In an off state in which an electric field is not applied, the liquid crystals in the liquid crystal droplets have an average refractive index due to alignment without directivity as illustrated in (a) of FIG. 2, and incident light is opaquely scattered due to refractive index mismatching. In an on state in which an electric field is applied, the liquid crystals in the liquid crystal droplets are aligned along an electric field direction as illustrated in (b) of FIG. 2, the liquid crystal droplets have the same effective refractive index as the polymer, and the incident light is transmitted through the element without experiencing a refractive index difference caused by the refractive index mismatching. The PDLC has an advantage of having a simple manufacturing process because a process for liquid crystal orientation is omitted and exhibits high transmission characteristics in case of the transparent mode. However, the PDLS has a disadvantage of requiring a high driving voltage to secure a high viewing angle like the PSCT and exhibits haze characteristics with respect to an oblique ray in the transparent mode because the polymer material mixed with the liquid crystals has an extremely high concentration. Thus, it is impossible to secure the low driving voltage and the high viewing angle at the same time.

SUMMARY

The present invention provides an active random refraction device capable of solving a trade off relationship between a viewing angle and a driving voltage and having a high viewing angle compared to a driving voltage of a typical technology.

The objects of the present invention are not limited to the abovementioned objects. Other objects thereof that are not mentioned will be understandable by those skilled in the art to which the present invention belongs from the following descriptions.

Embodiments of the present invention provide an active random refraction device that actively controls a field of view and coherence of light and removes color moire, the refraction device comprising: a random structure made of an isotropic medium having the same refractive index characteristics regardless of a polarization direction of light; a liquid crystal polymer aligned on the random structure and having refractive index characteristics that are varied according to the polarization direction of the light; and a polarization switching device configured to switch the polarization direction of the light between orthogonal first direction and second direction. Here, a refractive surface between the random structure and the liquid crystal polymer has a slope angle randomly distributed along a horizontal direction perpendicular to an incident direction of the light. The active random refraction device is switched between a transparent mode and a refraction mode according to polarization of the light. The transparent mode is a mode in which the light is transmitted without being refracted from the refractive surface due to refractive index matching between the random structure and the liquid crystal polymer, and the refraction mode is a mode in which the light is refracted from the refractive surface due to refractive index mismatching between the random structure and the liquid crystal polymer. The random structure may include a one dimensional arrangement random structure having a random structure in one direction or a two dimensional arrangement random structure having a random structure in both directions. The random structure has a lens structure or a pyramid structure.

The random structure may have a pyramid structure having a fill-factor and a slope angle, which are equal to or greater than set values, through an imprinting process of a pyramid random structure manufactured to have a fill-factor and a slope angle, which are equal to or greater than the set values through isotropic selective chemical etching of a <110> silicon substrate to secure the viewing angle and control coherence characteristics.

The polarization switching device may include a liquid crystal and one pair of electrodes configured to apply a voltage to the liquid crystal and is driven at a low voltage of 5V or less with a high response speed of 18 m/s or more due to a structure separated from the random structure.

The active random refraction device may further include a film substrate covering the liquid crystal polymer for alignment through a polymerization reaction of the liquid crystal polymer applied onto the random structure. The film substrate may be separated from the liquid crystal polymer after the liquid crystal polymer is aligned in order to improve a transmittance and reduce a thickness thereof.

The random structure may include a first random structure disposed on a first surface of a substrate and a second random structure disposed on a second surface of the substrate to secure the viewing angle wider than that of a single random structure. The two random structures may have a coherence characteristic control performance greater than that of the single random structure.

The liquid crystal polymer may include a first liquid crystal polymer disposed on the first random structure and a second liquid crystal polymer disposed on the second random structure.

A refractive surface between the first random structure and the first liquid crystal polymer may have a slope angle randomly distributed along a horizontal direction perpendicular to an incident direction of light. A refractive surface between the second random structure and the second liquid crystal polymer may have a slope angle randomly distributed along the horizontal direction.

The active random refraction device may be used as an active back light unit configured to switch light of a directional back light unit having straightness between a coherence mode having straightness and a surface light source mode having a wide viewing angle and controlled coherence.

The polarization switching device may include a first polarization switching device and a second polarization switching device, which are respectively disposed on opposite sides based on the random structure and the reactive mesogen, for the field of view and coherence control that allow incident light polarization to be maintained.

The first polarization switching device and the second polarization switching device may switch the polarization direction of the light between a first direction and a second direction, which are orthogonal to each other.

The first polarization switching device may be disposed in front of the reactive mesogen and the random structure based on a traveling direction of the light to switch polarization of light incident to the random structure. The second polarization switching device may be disposed behind the reactive mesogen and the random structure based on the traveling direction of the light to switch polarization of light outputted from the reactive mesogen.

In an embodiment, the second polarization switching device may switch the polarization of the light so that light transmitted through the second polarization switching device has the same polarization state as that of light before incident to the first polarization switching device.

In an embodiment, the active random refraction device may be used as an active back light unit (BLU) of a spatial light modulator (SLM) or a liquid crystal display (LCD) comprising a polarization plate.

According to the embodiment of the present invention, provided is the active random refraction device capable of solving the trade off relationship between the viewing angle and the driving voltage and having the high viewing angle compared to the driving voltage of the typical technology.

The effects of the present invention are not limited to the above-described effects. Other effects that are not mentioned will be clearly understandable by those skilled in the art from this specification and the accompanying drawings.

BRIEF DESCRIPTION OF THE DRAWINGS

FIG. 9 is a view showing an image that compares the fringe visibility value of the fringe pattern when the active random refraction device is not disposed with the fringe visibility value of the fringe pattern when the active random refraction device is disposed in a transmission mode (or transparent mode).

FIG. 15 shows embodiments of a 1D-type random structure used in the active random refraction device.

DETAILED DESCRIPTION

Figure 1:
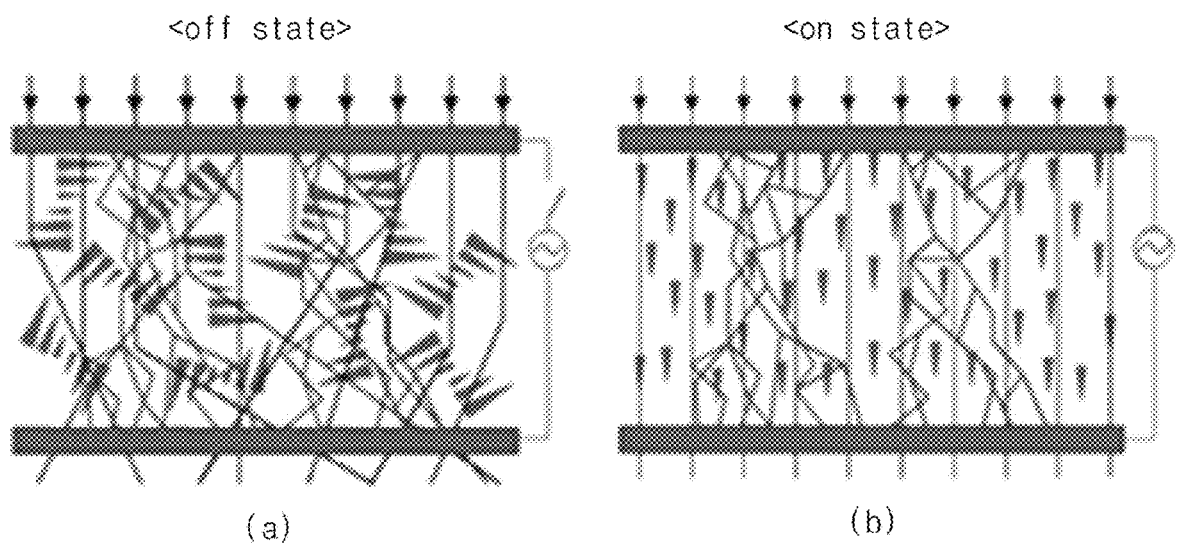
FIG. 1 is a conceptual view of polymer stabilized cholesteric texture films (PSCT) using an electric field.
Figure 2:
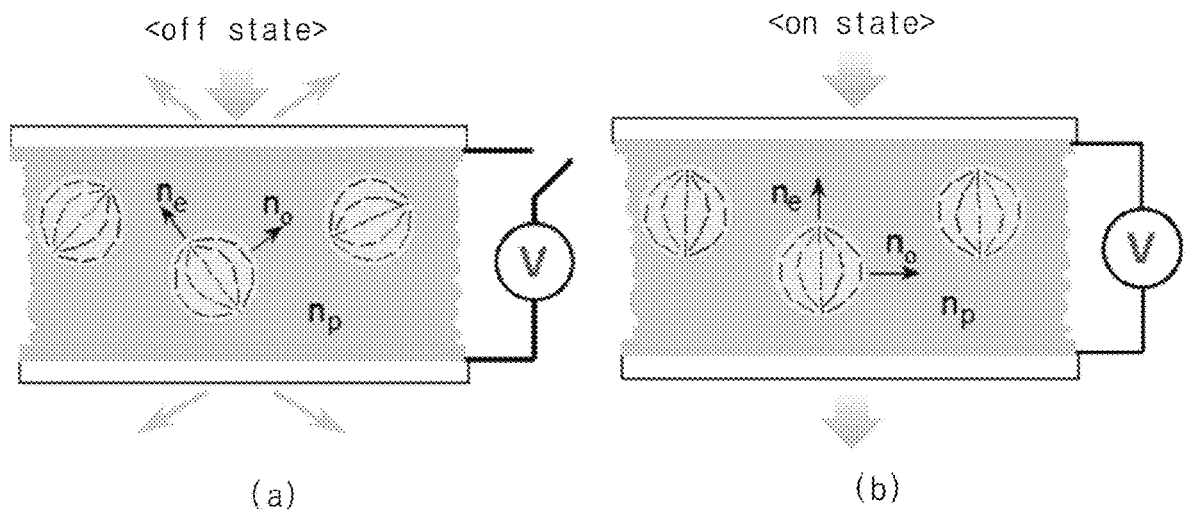
FIG. 2 is a conceptual view of a polymer dispersed liquid crystal (PDLC) using an electric field.

Advantages and features of the present invention, and implementation methods thereof will be clarified through following embodiments described with reference to the accompanying drawings. The present invention may, however, be embodied in different forms and should not be construed as limited to the embodiments set forth herein. Unless otherwise defined, all terms (including technical and scientific terms) used herein have the same meaning as generally understood by those skilled in the art. Moreover, detailed descriptions related to well-known functions or configurations will be ruled out in order not to unnecessarily obscure subject matters of the present invention. It is also noted that like reference numerals denote like elements in the drawings. Some components in the drawings may be exaggerated or reduced for helping understanding of the present invention.

The terms used in the present specification is for the purpose of describing exemplary embodiments, and do not intend to limit the present invention. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Figure 3:
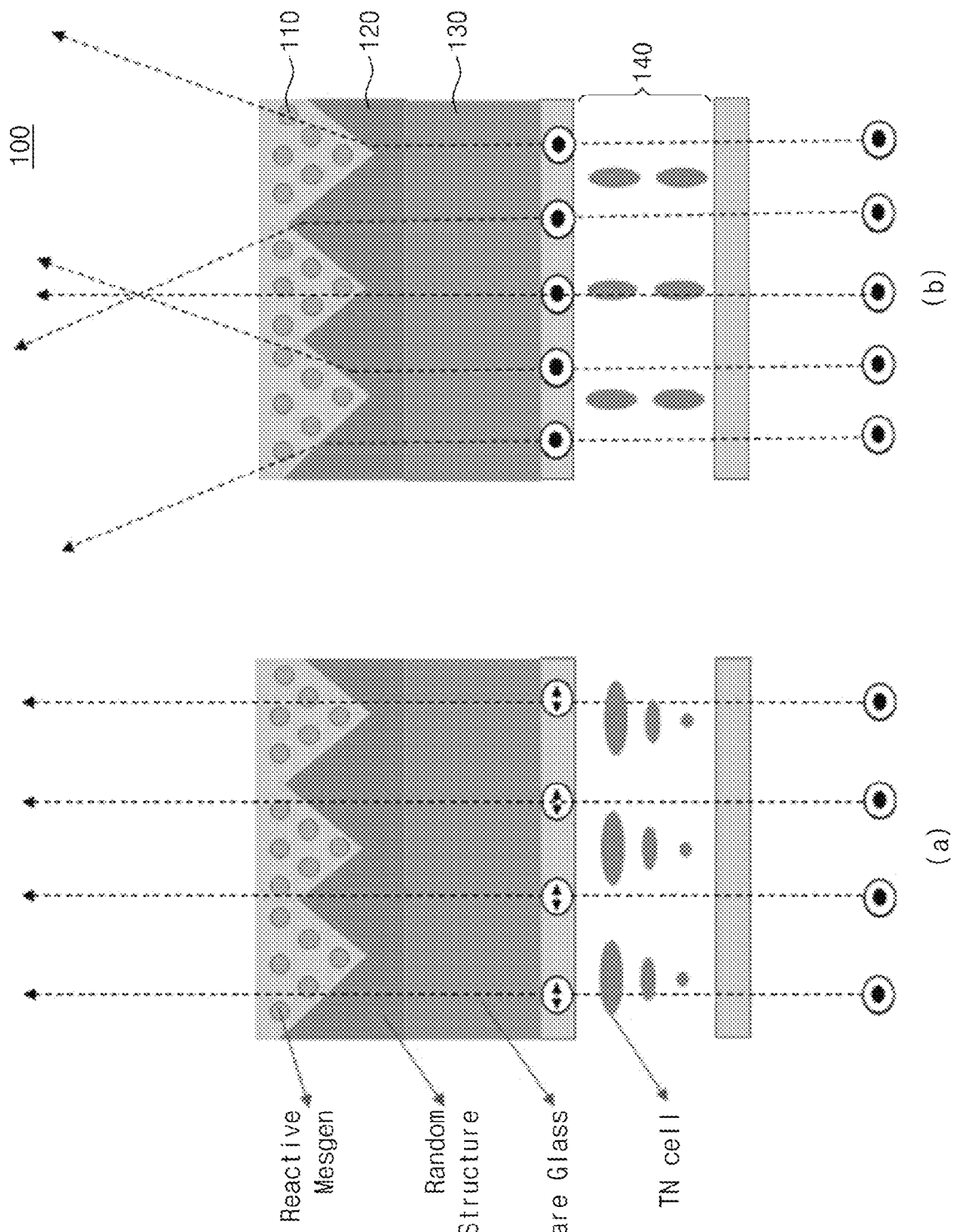
FIG. 3 is a view illustrating a structure of an active random refraction device system according to an embodiment of the present invention.

FIG. 3 is a view illustrating a structure of an active random refraction device system according to an embodiment of the present invention. An active random refraction device system 100 according to an embodiment of the present invention has a structure in which a liquid crystal polymer (or reactive mesogen (RM)) is aligned on a random structure (random structure prism) and comprises a reactive mesogen 110, a random structure 120, a bare glass 130, and a polarization switching device (TN cell) 140. The reactive mesogen 110 is a birefringent medium having refractive index characteristics varied according to a polarization direction. The random structure 120 is an isotropic medium having the same refractive index characteristics regardless of the polarization direction. The bare glass 130 is used as a substrate for imprinting of the random structure. The polarization switching device (TN cell) 140 is used as an element for switching polarized light. The incident light is incident in the same direction as a major axis direction of the birefringent medium, and the polarization switching device (TN cell) 140 converts the polarization direction into orthogonal polarization directions as a voltage applied to the liquid crystal is turned on and off. The polarization switching device 140 may include one pair of electrodes that applies a voltage to the liquid crystal.

The active random refraction device system according to an embodiment of the present invention has a transparent mode that transmits light and a random-refraction mode that refracts light randomly, according to polarization of the incident light. When a refractive index in a major axis direction of the reactive mesogen (RM) 110 having birefringent characteristics is $n_e$, and a refractive index in a minor axis direction is $n_o$, in case that the polarization direction of the incident light matches with the minor axis direction ((a) of FIG. 3), the refractive index of the RM is $n_o$, which matches with a refractive index $n_p$ of the random structure, and thus refraction does not occur (transparent mode). When the polarization direction of the incident light matches with the major axis direction ((b) of FIG. 3), the refractive index of the RM is $n_e$, which is different from the refractive index $n_p$ of the random structure 120 and thus refracting according to an inclination angle (or slope angle) of the random structure 120 (random-refraction mode).

As the random structure 120 according to an embodiment of the present invention is introduced, coherence characteristics generated in a periodic structure of a typical active prism and a color moire phenomenon generated on a display image may be controlled. A random-refraction device according to an embodiment of the present invention has modes changed according to polarization dependent characteristics and includes the polarization switching device (TN cell) 140 for polarization conversion of the incident light. Since the random-refraction device according to an embodiment of the present invention is a switching device based on the liquid crystal, the random-refraction device has a low driving voltage (equal to or less than 5 V) and a fast response speed (equal to or less than 18.6 m/s). Also, since the viewing angle characteristics of the random-refraction device according to an embodiment of the present invention is controlled according to variation of a slope angle and a fill-factor of the random structure 120, a driving voltage of the polarization switching device is not affected. That is, the trade off relationship between the viewing angle and the driving voltage may be solved.

FIG. 4A to FIG. 4D are views showing a method for manufacturing the active random refraction device according to an embodiment of the present invention. FIG. 5 is a photograph obtained by an electron microscope showing a random-mold template used for manufacturing the random refraction device by an imprinting method. The random-mold template may include a sandblast template (FIG. 5(a)) manufactured by precisely etching using a sandblast method, a random bead template (FIG. 5(b)) manufactured by using a bead, and a random pyramid template (FIG. 5(c)) manufactured by performing anisotropic selective chemical etching on a <110> silicon wafer.

Figure 4A:
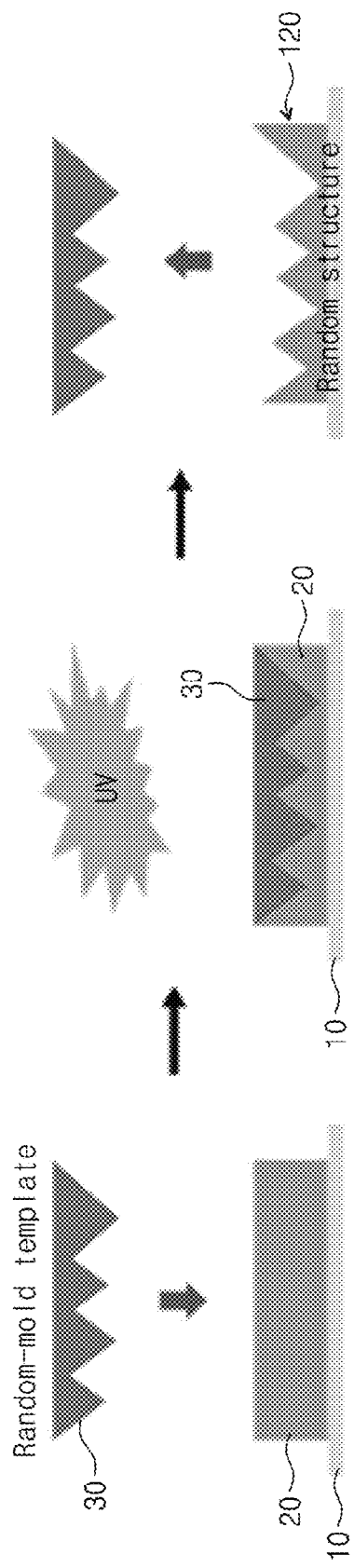
FIG. 4A through FIG. 4D are views showing a method for manufacturing an active random refraction device according to an embodiment of the present invention.
Figure 4B:
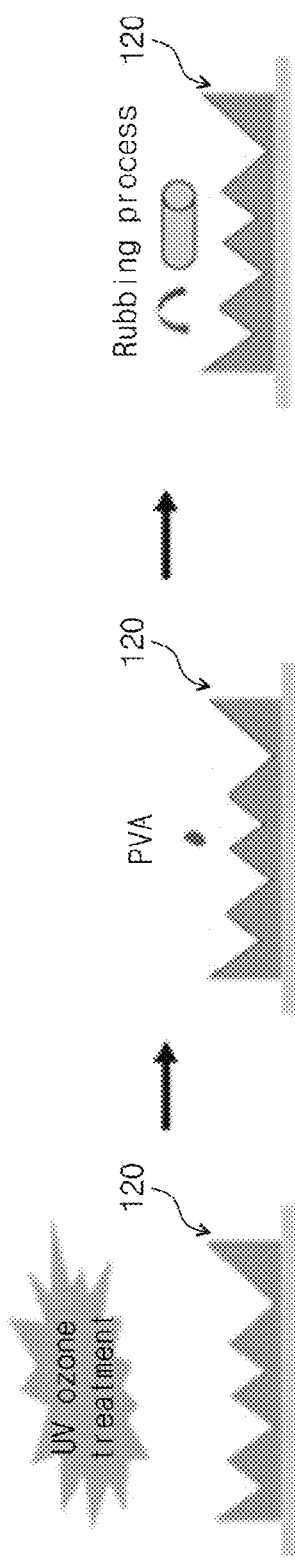
Figure 4C:
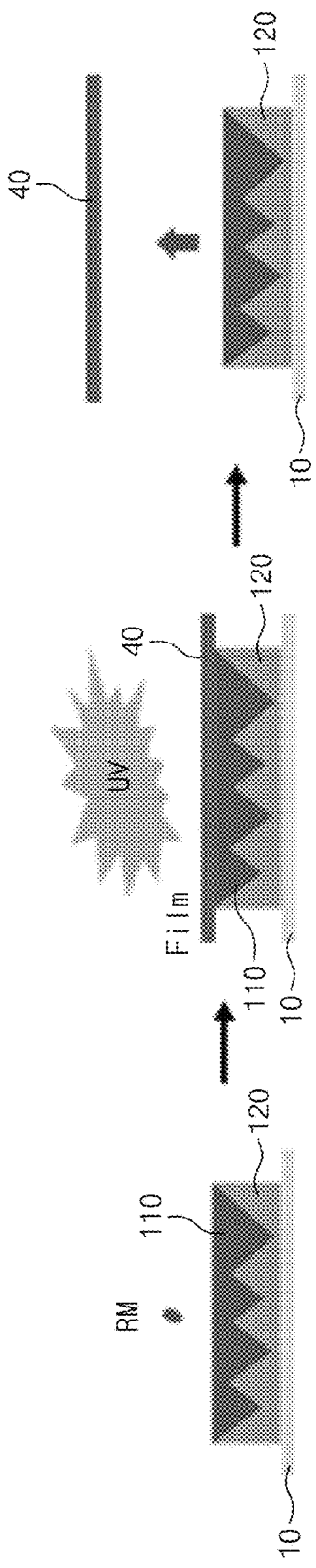
Figure 4D:
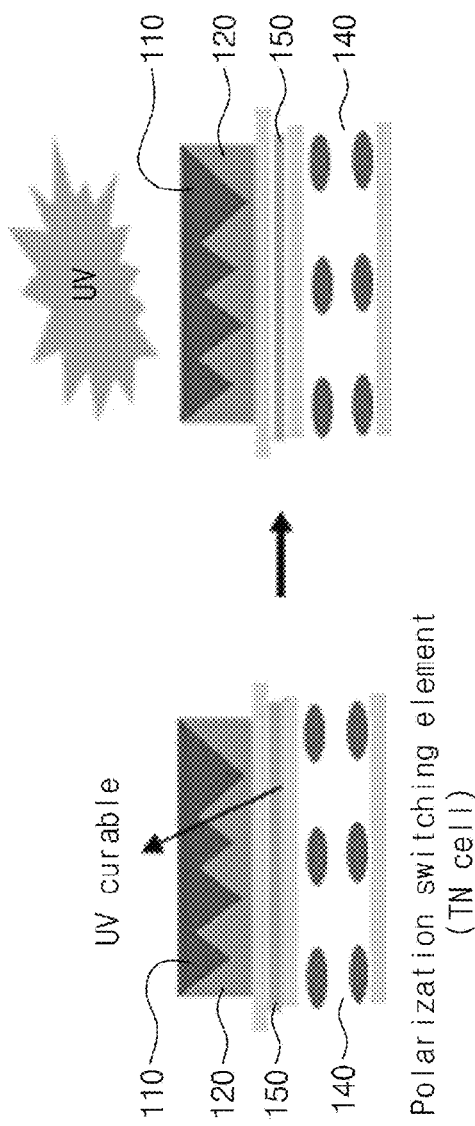
Figure 5:
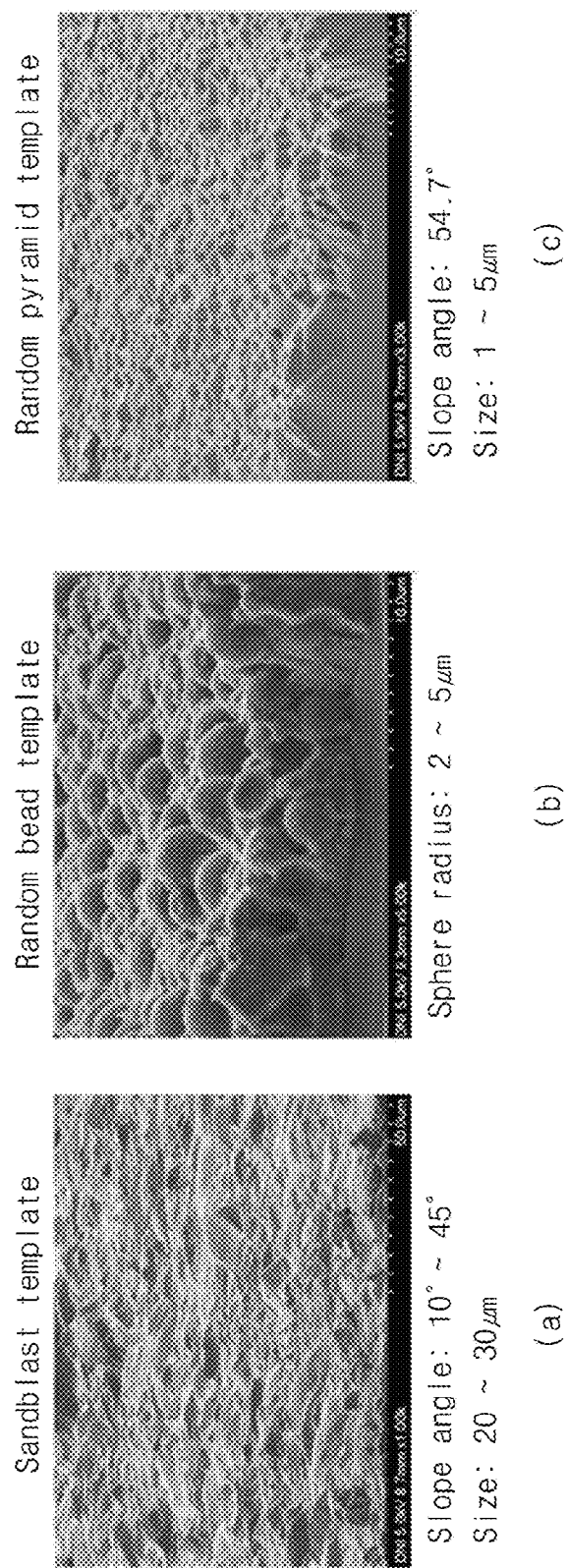
FIG. 5 is a photograph obtained by an electron microscope showing a random-mold template used for manufacturing the random refraction device in an imprinting method.

In order to manufacture the random reactive device, the random structure 120 having a reverse shape of the random-mold template 30 may be manufactured by applying a photocurable material 20 (e.g., NOA89 (n=1.51)) onto a glass substrate 10, the random-mold template 30, irradiating ultraviolet light (UV) for two minutes with an intensity of 20 mW/cm$^2$, and then separating the random-mold template 30 (see FIG. 4A). Thereafter, in order to form a thin-film of hydrophilic polyvinyl alcohol (PVA) for alignment of the reactive mesogen (RM), a UV ozone treatment is performed, then a coating and heat treatment is performed on the PVA at a temperature of 9° C. for 30 minutes, and then a rubbing process is performed (FIG. 4B). Thereafter, RM 110 is fallen onto the random structure 120, and then a film substrate 40 is applied to cover the random structure 120 having RM, then UV irradiation is performed for one minute with an intensity of 20 mW/cm$^2$, and then the upper film substrate 40 is separated (FIG. 4C). The treatment process for alignment is also performed on the upper film substrate 40 in the same manner as the lower substrate 10. Thereafter, in order to attach the polarization switching device (TN cell) 140 to a lower side of the device, a UV curable adhesive layer 150 (e.g., NOA 69) is applied and then UV-cured (FIG. 4D).

Figure 6:
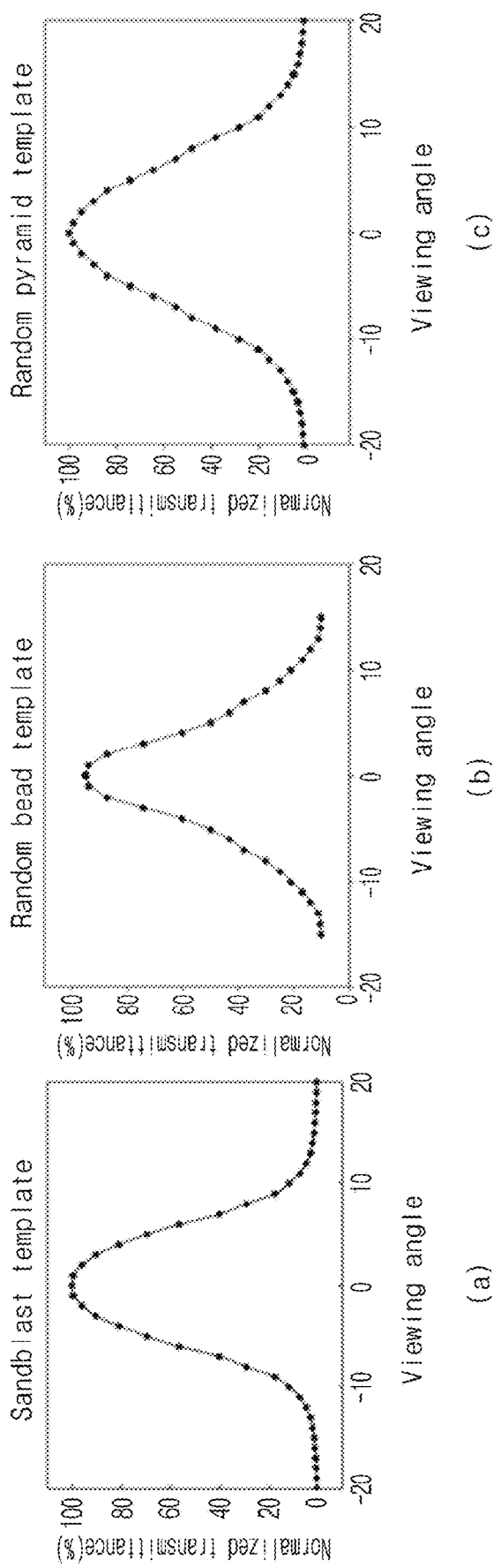
FIG. 6 is a view showing viewing angle characteristics in a random-refraction mode of the active random refraction device manufactured according to an embodiment of the present invention.

FIG. 6 shows viewing angle characteristics in a random-refraction mode of the active random refraction device manufactured according to an embodiment of the present invention. The viewing angle characteristics are highest when the random pyramid template having a high slope angle is used and a large fill-factor is high. The manufactured active random refraction device has the improved viewing angle as the fill-factor and the slope angle of the random-mold template increase regardless of the driving voltage because the switching device and the random structure are separated from each other.

Figure 7:
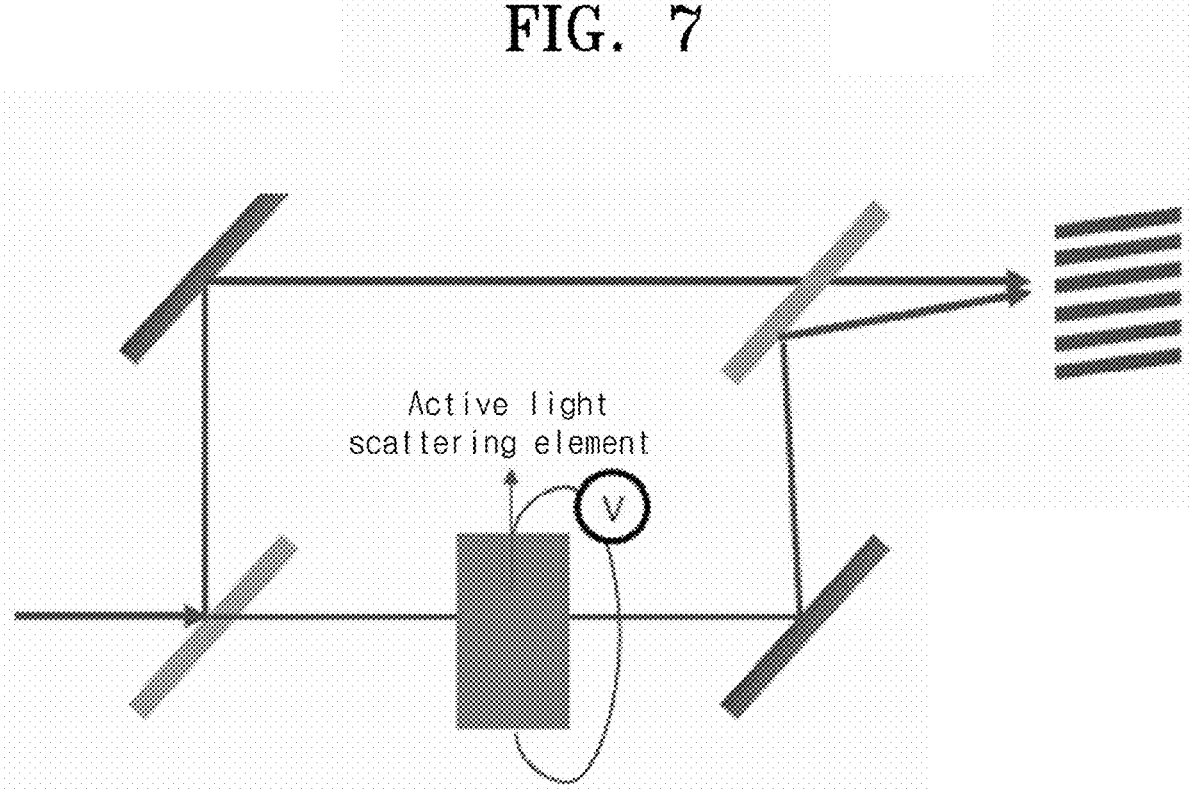
FIG. 7 is a schematic view illustrating set up of a mach-zehnder interferometer experiment.
Figure 8:
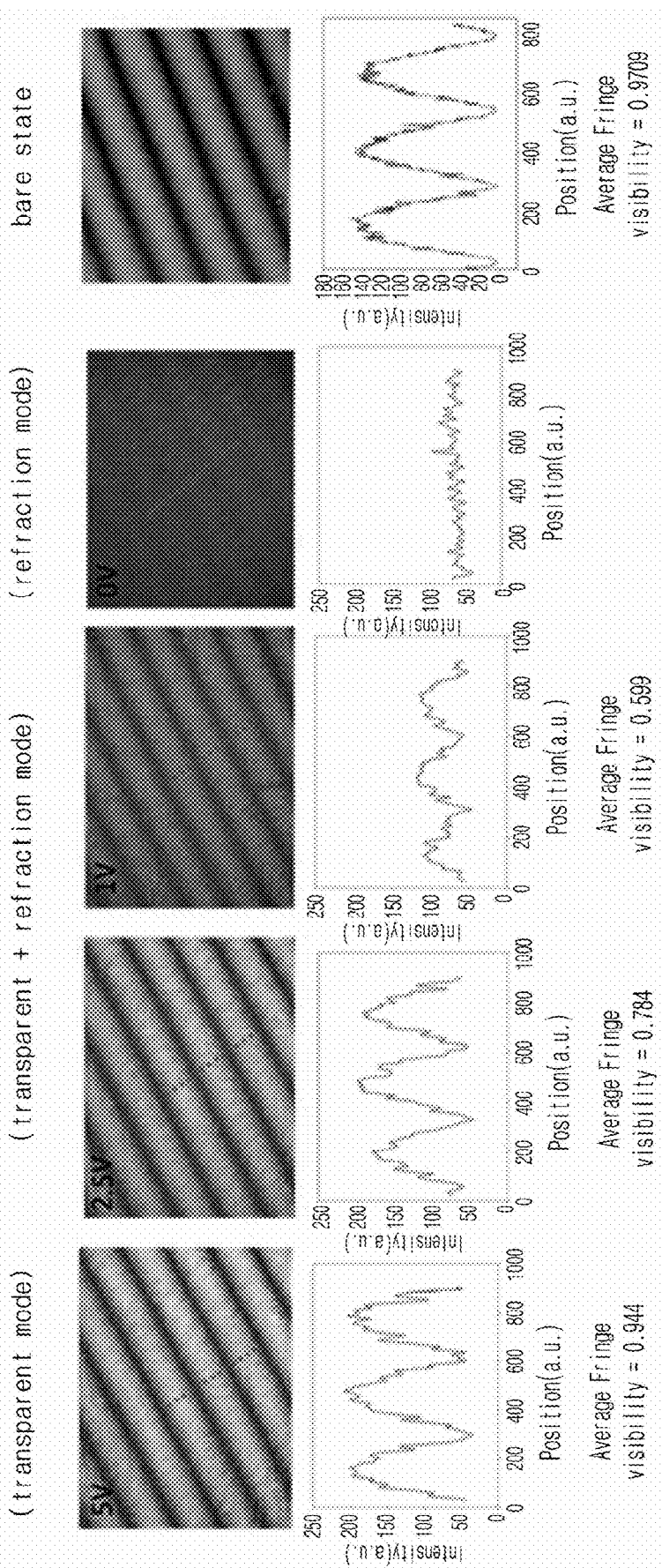
FIG. 8 is a view showing a photographed fringe pattern and a fringe visibility value.

FIG. 7 is a schematic view illustrating set up of a mach-zehnder interferometer experiment. A fringe pattern was formed by using the mach-zehnder interferometer and an evaluating fringe visibility for each voltage applied to the switching device of the active random refraction device was performed in order to evaluate coherence characteristics of the active random refraction device manufactured according to an embodiment of the present invention. FIG. 8 shows a photographed fringe pattern and a fringe visibility value. It was confirmed that the fringe visibility value increases as the random-refraction mode is switched to the transparent mode from the random-refraction mode. That is, the coherence characteristics may be controlled according to the voltage of the switching device.

FIG. 9 shows an image that compares the fringe visibility value (left drawing of FIG. 9) of the fringe pattern when the active random refraction device is not present in the transparent mode with the fringe visibility value (right drawing of FIG. 9) of the fringe pattern when the active random refraction device is present in the transparent mode. It may be confirmed that there is no big difference between the above two cases. That is, the coherence characteristics are well maintained in the transparent mode.

Figure 10:
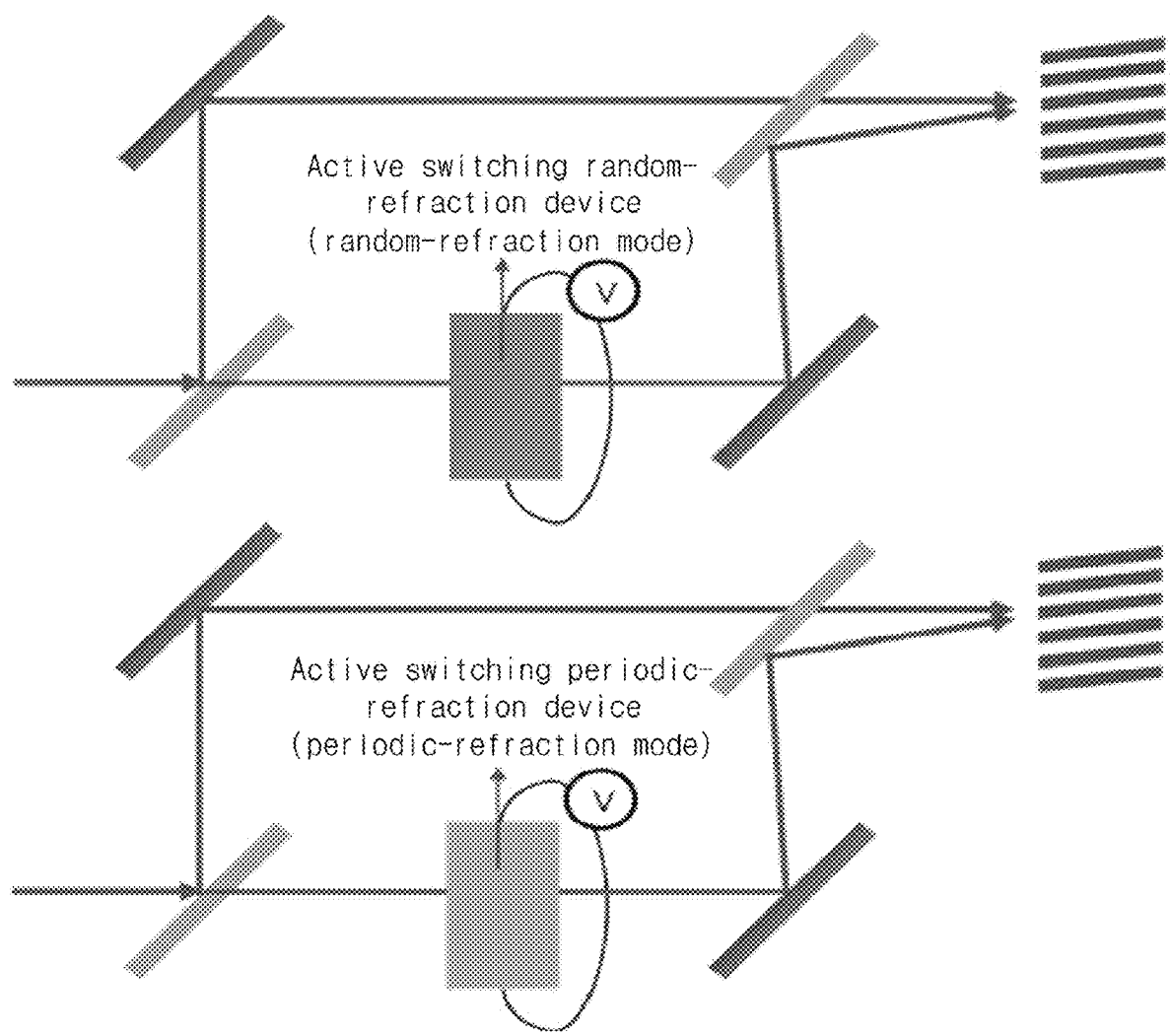
FIG. 10 is a schematic view illustrating set up of an experiment for photographing a fringe pattern of a periodic-refraction mode of an active periodic refraction device and a random-refraction mode of an active random refraction device.
Figure 11:
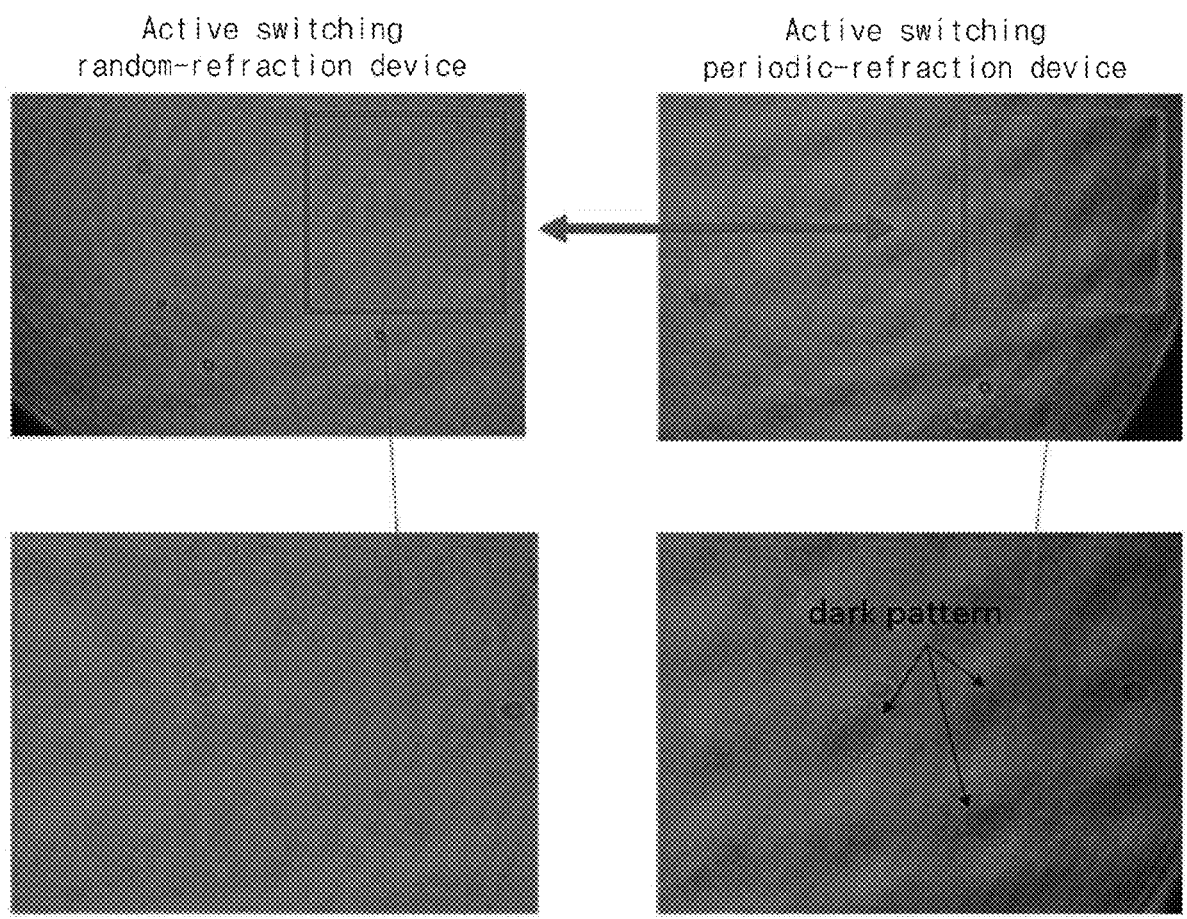
FIG. 11 shows photographed images.

FIG. 10 is a schematic view illustrating set up of an experiment for photographing fringe patterns of a periodic-refraction mode of an active periodic refraction device (or active switching periodic-refraction device) and a random-refraction mode of an active random refraction device (or active switching random-refraction device), and FIG. 11 shows photographed images. In case of the active random refraction device, the fringe pattern is disappeared as the coherence characteristics are controlled, and in case of the active periodic refraction device, the fringe pattern remains as the coherence characteristics are not controlled due to regular structure.

Figure 12:
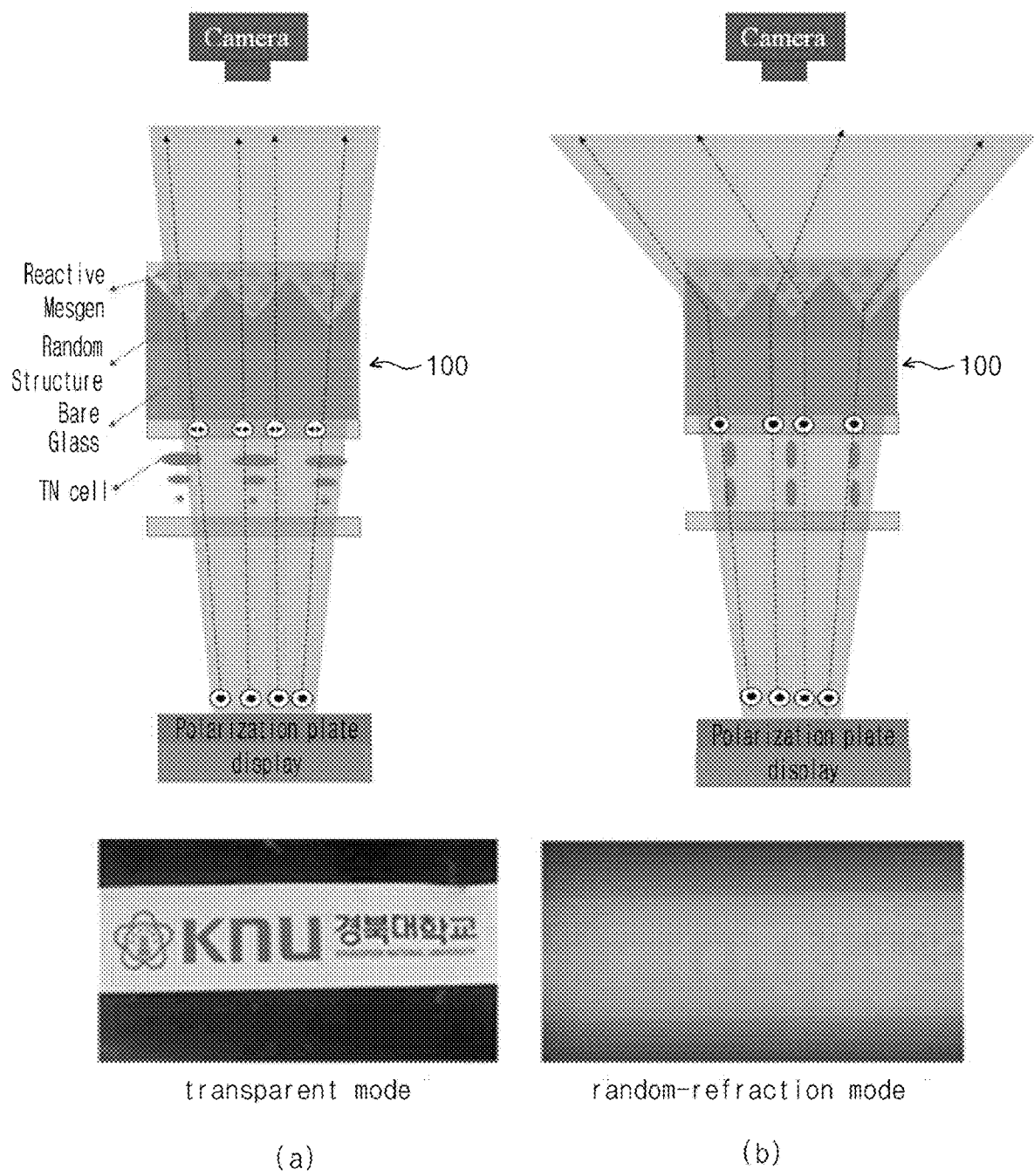
FIG. 12 is a schematic view for checking image formation according to the random-refraction mode and the transparent mode of the active random refraction device on a display displayed in the form of lambertian and images photographed by a camera.

FIG. 12 schematically shows image formation according to the random-refraction mode and the transparent mode of the active random refraction device 100 on a display displayed in the form of lambertian and images photographed by a camera. An image without distortion is obtained in the transparent mode as transmitted light satisfies index matching, and a blurred image that is overlapped due to refraction as transmitted light is index-mismatched.

Figure 13:
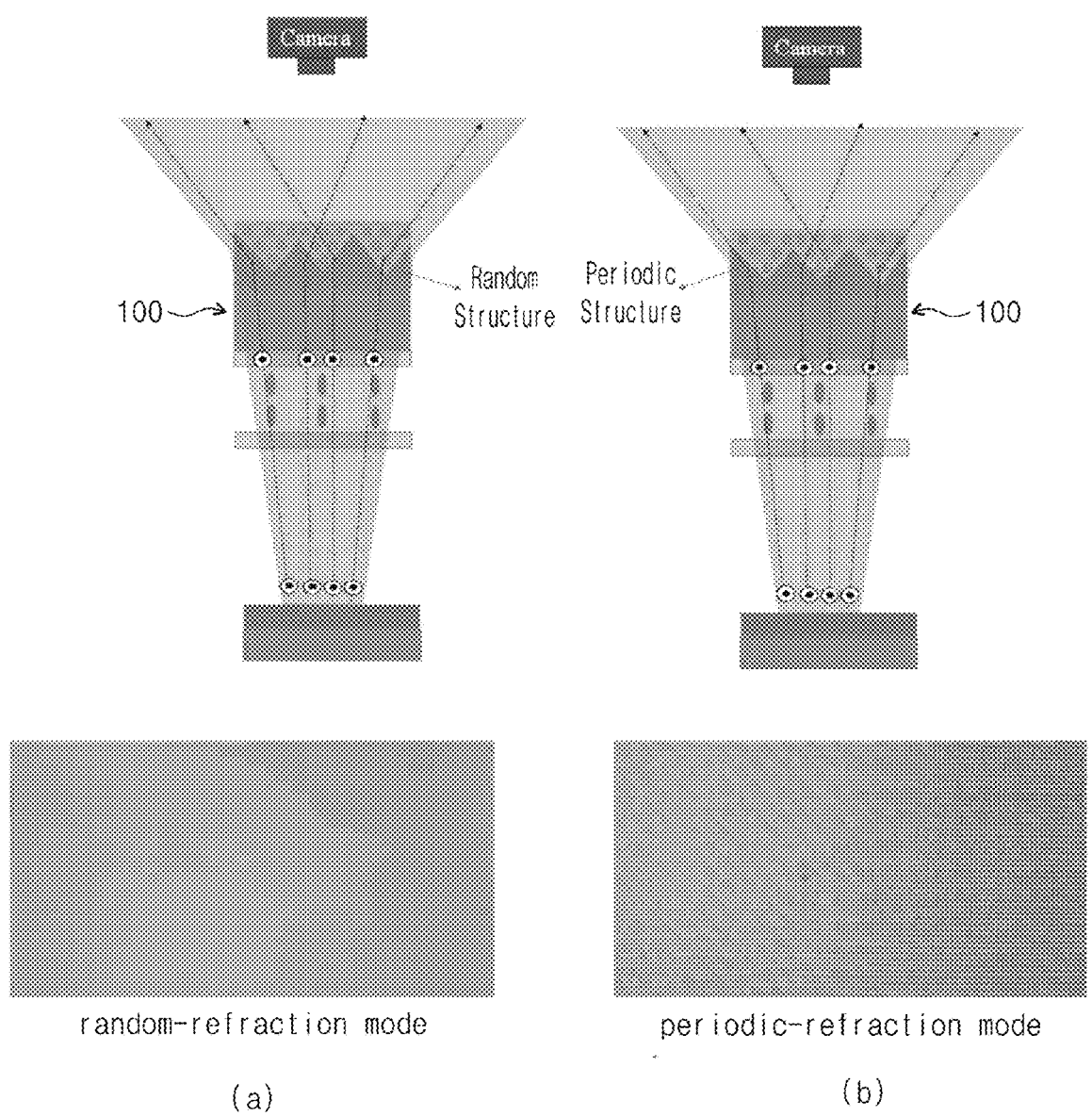
FIG. 13 is a view showing an image view for checking image formation characteristics of the random-refraction mode of the active random refraction device and the periodic-refraction mode of the active periodic refraction device after a white image is displayed on the display displayed in the form of lambertian.

FIG. 13 is an image view showing image formation characteristics of the random-refraction mode of the active random refraction device 100 and the periodic-refraction mode of the active periodic refraction device after a white image is displayed on the display displayed in the form of lambertian. In case of the non-periodic structure, the white image is directly formed as an image. In case of the active periodic refraction device, the color moire phenomenon is observed due to the periodic structure. That is, the color moire phenomenon may be removed when the non-periodic structure is applied.

Figure 14A:
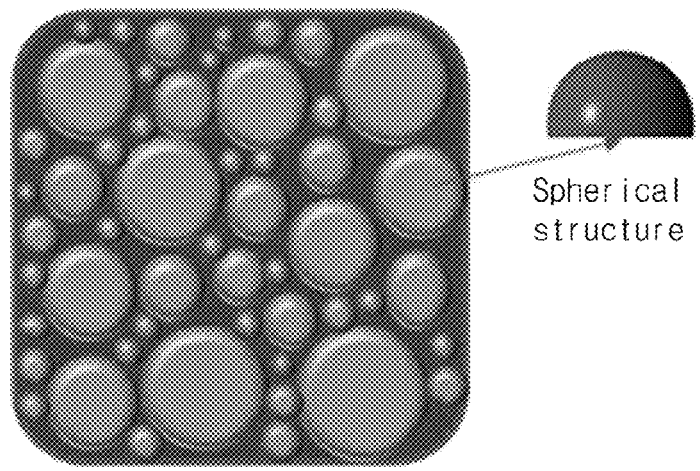
FIG. 14A and FIG. 14B show embodiments of a two dimensional (2D-type) random structure (or random-mold template) used in the active random refraction device.
Figure 14B:
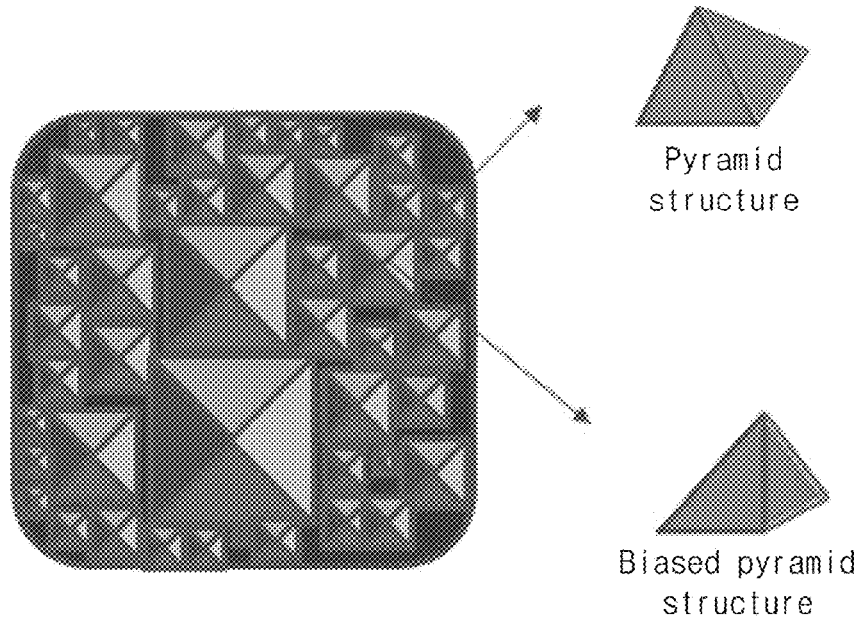

FIG. 14A and FIG. 14B show embodiments of a two dimensional (2D-type) random structure (or random-mold template) used for the active random refraction device. Refraction may occur in all of a vertical direction and a horizontal direction in the active random refraction device including the 2D-type random structure. The 2D-type random structure may be manufactured in various shapes such as a lens or a pyramid. FIG. 14A shows a random lens structure capable of securing high viewing angle characteristics through a short focal distance and a high orientation. However, a process of directly etching a lens having a short focal distance has difficulty and requires high costs. FIG. 14B shows a random structure having a pyramid structure shape, which is capable of having a large fill-factor and a high slope angle through anisotropic selective chemical etching and requires a relatively simple process and low costs. When a pyramid structure having a central axis biased to a specific direction is applied, the pyramid shaped random structure may be used for an application (a vehicle, a display, etc.) requiring high viewing angle characteristics in a specific direction. Also, since the pyramid structure has a rhombus shaped structure, characteristics thereof are changed according to an alignment direction thereof. Thus, aligning based on the shape/structure of the pyramid structure allows a higher orientation and improved viewing angle.

FIG. 15 shows embodiments of a one dimensional (1D-type) random structure (or random-mold template) used for the active random refraction device. The 1D-type random structure may secure a viewing angle in a preferred direction among the vertical direction or the horizontal direction. Since the 1D-type random structure may have a simpler manufacturing process than that of the 2D-type random structure and be oriented along a valley direction, alignment of the liquid crystal polymer may be further improved. Also, the viewing angle in a specific direction may be secured by using the 1D-type random structure (FIG. 15(*b*)) having a central axis biased to a specific direction. The 1D-type random structure may be provided as a lens shaped structure.

Figure 16:
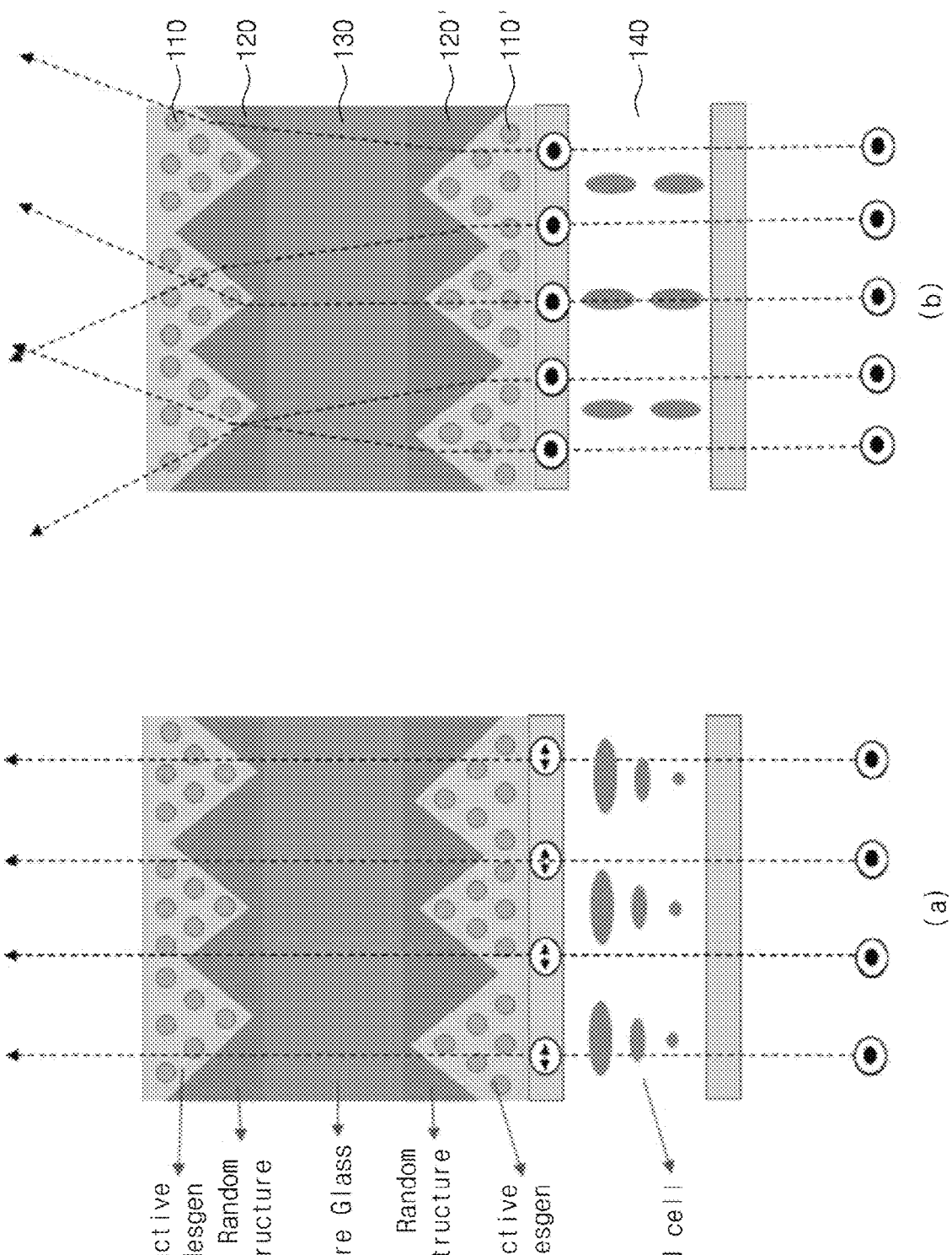
FIG. 16 is a view illustrating an active random reactive element having a laminated structure according to another embodiment of the present invention.

FIG. 16 is a view illustrating an active random reactive element having a laminated structure according to another embodiment of the present invention. FIG. 16 shows a structure in which two random refraction devices are laminated on both surfaces of a bare glass. The active random refraction device may include a first random structure 120 disposed on a first surface of a glass substrate 130, a second random structure 120' disposed on a second surface of the glass substrate 130, a first reactive mesogen 110 disposed on the first random structure 120, a second reactive mesogen 110' disposed on the second random structure 120', and a polarization switching device 140.

A refractive surface between the first random structure 120 and the first liquid crystal polymer 110 may have a slope angle that is randomly distributed along a horizontal direction perpendicular to an incident direction of light. A refractive surface between the second random structure 120' and the second liquid crystal polymer 110' may have a slope angle that is randomly distributed along a horizontal direction perpendicular to an incident direction of light. When the laminated structure is used, the viewing angle may be improved through a simple process relative to a method of increasing the fill-factor and the slope angle of the random structure. Also, since a transmittance is reduced according to the laminated structure, both surfaces of the bare glass may be used as an imprinting substrate, and transmittance reduction may be improved through upper film separation of the photocurable liquid crystal polymer.

Figure 17:
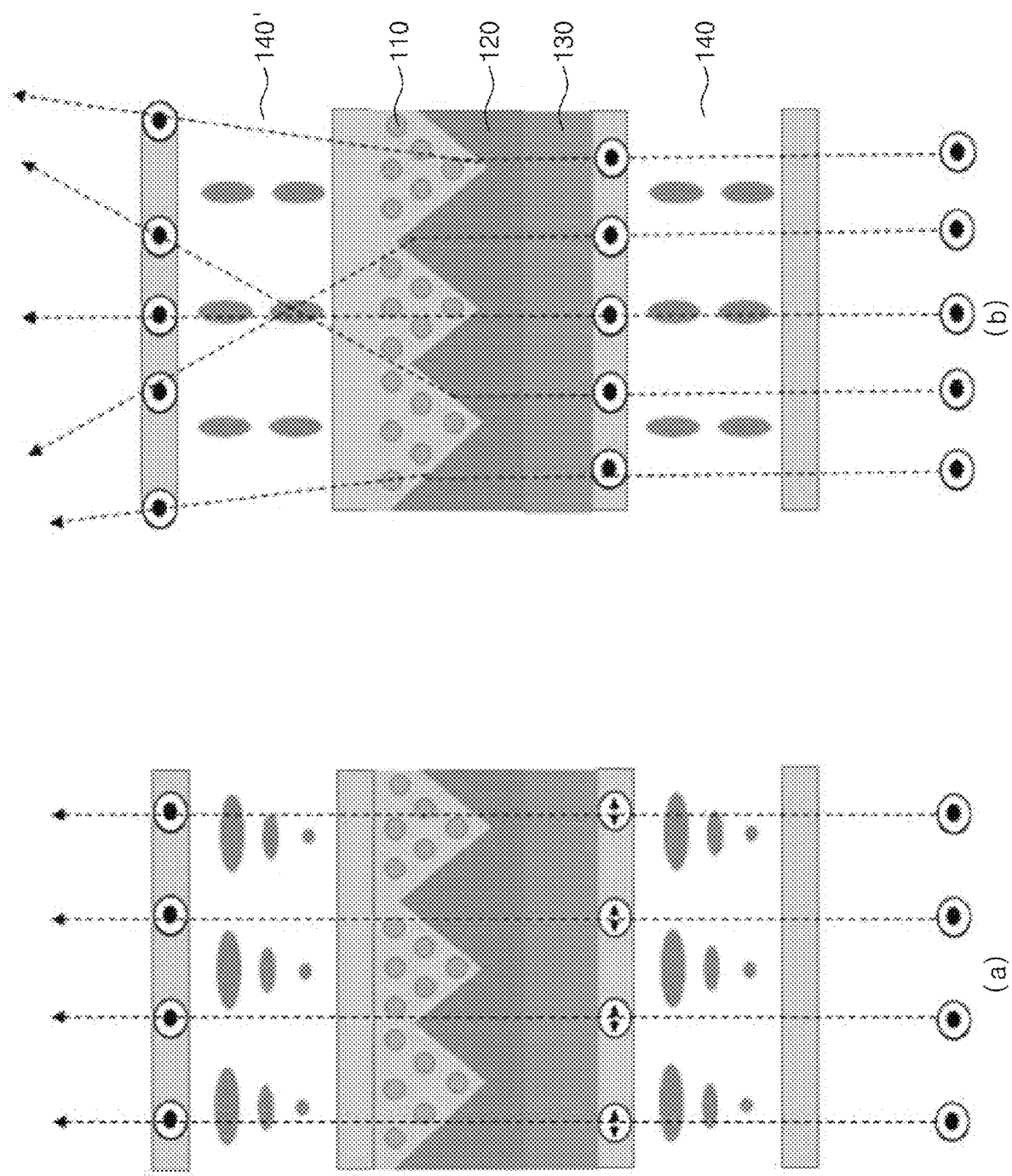
FIG. 17 is a schematic view illustrating an active random refraction device capable of maintaining polarization of incident light according to still another embodiment of the present invention.

FIG. 17 is a schematic view of an active random refraction device capable of maintaining polarization of incident light according to still another embodiment of the present invention. The active random refraction device illustrated in FIG. 17 has a structure in which polarization switching devices 140 and 140' are respectively laminated on both surfaces of the random refraction device.

The active random refraction device may include a first polarization switching device 140 and a second polarization switching device 140', which are respectively disposed on opposite sides based on a random structure 120 and a reactive mesogen 110. The first polarization switching device 140 and the second polarization switching device 140' may switch a polarization direction of light between a first direction and a second direction, which are orthogonal to each other. The first polarization switching device 140 may be disposed in front of the reactive mesogen 110 and the random structure 120 based on a traveling direction of light to switch polarization of light incident to the random structure 120. The second polarization switching device 140' may be disposed behind the reactive mesogen 110 and the random structure 120 based on a traveling direction of light to switch polarization of light outputted from the reactive mesogen 110.

The second polarization switching device 140' may switch polarization of light so that light transmitted through the second polarization switching device 140' has the same polarization state as that of light before incident to the first polarization switching device 140. According to an embodiment of FIG. 17, a polarization state before incident and a polarization state after incident may be equally maintained. That is, since a field of view and coherence may be controlled while maintaining polarization before and after incident, the polarization switching device may be used for a display element (a liquid crystal display (LDC)) and a spatial light modulator (SLM)) using a polarization filter.

As described above, the active random reactive element according to an embodiment of the present invention may obtain lower driving voltage, fast response speed, fast mode conversion speed, and high viewing angle characteristics through the liquid crystal based polarization switching device and surface morphology characteristics of the random structure because the random structure part and the polarization switching part are separated from each other.

According to an embodiment of the present invention, random refraction of incident light may occur through voltage adjustment of the polarization switching part and introduction of the random structure, the coherence characteristics of the periodic structure may be controlled, and the color moire phenomenon may be prevented when applied to a display image.

Also, when the active random refraction device is manufactured by using the laminated structure, the removal of the film substrate of the photocurable liquid crystal polymer and imprinting on both surfaces of the glass substrate may be performed. Thus, the transmittance reduction may be minimized. The active switching random reactive element according to an embodiment of the present invention may convert a directional back light unit (BLU) having straightness into a surface light source mode having a wide viewing angle. The active random reactive element according to an embodiment of the present invention may be manufactured into a one dimensional (1D) arrangement lenticular random structure or a two dimensional (2D) arrangement random structure (a lens, a pyramid, etc.). The active random reactive element according to an embodiment of the present invention may be manufactured with low costs and a relatively simple process through imprinting of the random pyramid structure substrate having the large fill-factor and the high slope angle by using a <110> silicon wafer substrate process. Also, as the polarization switching part is applied to each of both surfaces of the random refraction device, the field of view and the coherence may be controlled while maintaining the polarization state of incident light. The active random reactive element according to an embodiment of the present invention may be applied to various fields such as a smart window, a vehicle display, and a mobile display.

The above embodiments are provided to help understanding of the prevent invention, but do not limit the scope of the present invention, and thus those with ordinary skill in the technical field of the present invention pertains will be understood that the present invention can be carried out in other specific forms without changing the technical idea or essential features. Therefore, the technical scope of protection of the present invention will be determined by the technical idea of the scope of the appended claims, and also will be understood as not being limited to the literal description in itself, but reaching the equivalent technical values of the present invention.

The invention claimed is:

1. An active random refraction device for actively controlling a field of view and coherence and removing color moire, comprising:
    a random structure comprising an isotropic medium having a same refractive index characteristics regardless of a polarization direction of light;
    a liquid crystal polymer aligned on the random structure and having refractive index characteristics that are varied according to the polarization direction of the light; and
    a polarization switching device configured to switch the polarization direction of the light between a first direction and a second direction, the first direction and the second direction being orthogonal to each other,
    wherein a refractive surface between the random structure and the liquid crystal polymer has a slope angle randomly distributed along a horizontal direction perpendicular to an incident direction of the light,
    wherein the active random refraction device is configured to switch between a transparent mode and a refraction mode according to polarization of the light, the transparent mode is a mode in which the light is transmitted without being refracted from the refractive surface due to refractive index matching between the random structure and the liquid crystal polymer, and the refraction mode is a mode in which the light is refracted from the refractive surface due to refractive index mismatching between the random structure and the liquid crystal polymer; and
    wherein the random structure comprises a first random structure disposed on a first surface of a substrate and a second random structure disposed on a second surface of the substrate to secure a viewing angle wider than that of a single random structure and have a coherence characteristic control performance greater than that of the single random structure.

2. The active random refraction device of claim 1, wherein the random structure comprises a one dimensional arrangement random structure having a random structure in one direction or a second dimensional arrangement random structure having a random structure in both directions, and the random structure has a lens structure or a pyramid structure.

3. The active random refraction device of claim 2, wherein the random structure has a pyramid structure having a fill-factor and a slope angle, which are equal to or greater than set values, through an imprinting process of a pyramid random structure manufactured to have a fill-factor and a slope angle, which are equal to or greater than the set values through isotropic selective chemical etching of a silicon substrate to secure a viewing angle and control coherence characteristics.

4. The active random refraction device of claim 1, wherein the polarization switching device comprises a liquid crystal and one pair of electrodes configured to apply a voltage to the liquid crystal and is driven at a low voltage of 5V or less with a high response speed of 18 m/s or more due to a separation between the polarization switching device and the random structure.

5. The active random refraction device of claim 1, further comprising a film substrate covering the liquid crystal polymer for alignment through a polymerization reaction of the liquid crystal polymer applied onto the random structure,
wherein the film substrate is separated from the liquid crystal polymer after the liquid crystal polymer is aligned to improve a transmittance and reduce a thickness thereof.

6. The active random refraction device of claim 1, wherein the liquid crystal polymer comprises a first liquid crystal polymer disposed on the first random structure and a second liquid crystal polymer disposed on the second random structure.

7. The active random refraction device of claim 6, wherein a refractive surface between the first random structure and the first liquid crystal polymer has a slope angle randomly distributed along a horizontal direction perpendicular to an incident direction of light, and
a refractive surface between the second random structure and the second liquid crystal polymer has a slope angle randomly distributed along the horizontal direction.

8. The active random refraction device of claim 1, wherein the active random refraction device is configured for use as active back light unit configured to switch light of a directional back light unit having straightness between a coherence mode having straightness and a surface light source mode having a wide viewing angle and controlled coherence.

9. An active random refraction device for actively controlling a field of view and coherence and removing color moire, comprising:
a random structure comprising an isotropic medium having a same refractive index characteristics regardless of a polarization direction of light;
a liquid crystal polymer aligned on the random structure and having refractive index characteristics that are varied according to the polarization direction of the light; and
a polarization switching device configured to switch the polarization direction of the light between a first direction and a second direction, the first direction and the second direction being orthogonal to each other,
wherein a refractive surface between the random structure and the liquid crystal polymer has a slope angle randomly distributed along a horizontal direction perpendicular to an incident direction of the light,
wherein the active random refraction device is configured to switch between a transparent mode and a refraction mode according to polarization of the light, the transparent mode is a mode in which the light is transmitted without being refracted from the refractive surface due to refractive index matching between the random structure and the liquid crystal polymer, and the refraction mode is a mode in which the light is refracted from the refractive surface due to refractive index mismatching between the random structure and the liquid crystal polymer;
wherein the polarization switching device comprises a first polarization switching device and a second polarization switching device, which are respectively disposed on opposite sides based on the random structure and the liquid crystal polymer, for the field of view and coherence control that allow incident light polarization to be maintained.

10. The active random refraction device of claim 9, wherein the first polarization switching device and the second polarization switching device are configured to switch the polarization direction of the light between a first direction and a second direction, which are orthogonal to each other.

11. The active random refraction device of claim 9, wherein the first polarization switching device is disposed in front of the liquid crystal polymer and the random structure based on a traveling direction of the light to switch polarization of light incident to the random structure, and
the second polarization switching device is disposed behind the liquid crystal polymer and the random structure based on the traveling direction of the light to switch polarization of light outputted from the reactive mesogen.

12. The active random refraction device of claim 11, wherein the second polarization switching device is configured to switch the polarization of the light so that light transmitted through the second polarization switching device has a same polarization state as that of light before incident to the first polarization switching device.

13. The active random refraction device of claim 9, wherein the active random refraction device is configured for use as an active back light unit (BLU) of a spatial light modulator (SLM) or a liquid crystal display (LCD) comprising a polarization plate.

* * * * *